United States Patent Office 2,886,583
Patented May 12, 1959

2,886,583

PRODUCTION OF ORGANO-SILICON COMPOUNDS

Hans Wilhelm Kautsky and Bodo Bartocha, Marburg (Lahn), Germany; said Bartocha assignor to said Kautsky No Drawing. Application June 14, 1956
Serial No. 591,263

8 Claims. (Cl. 260—448.2)

This invention relates to the production of organo-silicon compounds from simple inorganic silicon componds with the aid of Grignard reagents.

The reactivity of silicon compounds with Grignard reagents has been widely studied and many papers have been presented showing the variety of compounds which may be produced through selection of the starting materials and the conditions under which they are brought together. The halides of silicon are capable of reacting successfully with from one to four molecules of Grignard reagents to give compounds having carbon silicon bonds such as the ethyl chlorosilane compounds. These chlorosilanes may in turn be hydrolyzed to give silanols and these in turn may be condensed to give silicones. Much commercial research has been done in this field and many useful compositions have been thus prepared.

Chlorosilanes have also been prepared by the reaction of alkyl chlorides with silicon in the presence of catalytic materials such as copper or by contact with silicon-copper alloy. This mode of operation avoids the necessity of first preparing the halide of silicon and reacting it with a Grignard reagent. A large part of commercial silicone production is synthesized in this manner.

The prior art methods employing the Grignard reagent yield mixtures of chlorosilanes which hydrolyze to mixtures of silanols. The avoidance of such mixtures requires difficult rectification procedures due to the closeness of the boiling points of the various chlorosilanes. The silicon product resulting from the hydrolysis and polymerization of a difunctional chlorosilane ($R_2SiCl_2$) is of special interest commercially due to the fact that it makes possible the building of long chain and cyclic silicone compounds. These silicones or straight chain polysiloxanes cannot be produced from the unifunctional compounds which are usually in admixture with the difunctional products coming grom the Grignard synthesis of the prior art.

A specific objective of this invention is to provide a simplified procedure for the preparation of organo-silicon compounds having Si—C bonds by the Grignard method. Another object is to apply this method to the production of organo silanols and siloxanes from certain cheaper more available raw materials than have been found applicable in the prior art. A further object is to provide a new method which will yield unusually high proportions of difunctional organo silanols and siloxanols useful as silicone intermediates thereby providing higher yields of long chain silicone products. A still further object is the avoidance of the necessity of converting natural silicon materials to their halides prior to the formation of the organo-silicon compounds. Further objects and advantages will become apparent from the detailed disclosures and operating examples.

This invention, which provides a method and process for the production of organo-silicon compounds, comprises chemically reacting silicon-oxygen compounds selected from the class consisting of binary silicon oxides and hydrous silicon oxides with a Grignard reagent preferably in the presence of a suitable solvent such as dibutyl ether, effecting said reaction by digesting at elevated temperature for an appropriate time and recovering the resulting silicone intermediates which may then be hydrolyzed and condensed by a known means to form silicone products and other organo polysiloxanes.

In a more specific embodiment, this invention comprises suspending a pulverulent or high surfaced silicon oxide material in a suitable anhydrous solvent, containing a Grignard reagent as a solute, and maintaining the mixture at an elevated temperature until substantial amounts of the silicon oxide material have reacted with the said reagent separating the clear solution from the remaining solids, subjecting said solution to the action of water or alcohols of varying pH value for the hydrolysis or alcoholysis of the intermediate magnesium compounds, separating the organo-silicon hydrolyzed products from the aqueous layer, drying, and recovering the resulting organo-silicon compounds.

In carrying out this Grignard reaction the reagent may be prepared by any of the well known methods and subsequently introduced into the reaction mixture with the silicon-oxygen raw material, or this Grignard reagent may be generated in the reaction environment by introducing suitably cleaned and dried magnesium metal and an anhydrous alkyl chloride. This latter procedure is simply the known so-called Barbier variation of the Grignard process.

Any of the known Grignard reagents may be used and their selection will depend upon the organic group which is to be introduced into the ultimate organo-silicon compound. Grignard reagents are generally indicated as having the formula RMgX in which R represents an organic group usually a hydrocarbon radical and X may be chloride, bromine or iodine. In preparing this Grignard, any of a large number of organic halides may be used including particularly the alkyl and aryl halides. Examples of these halides are methyl bromide, ethyl bromide, propyl chloride, ethyl chloride, ethyl iodide, phenyl bromide, benzyl chloride, and many others. It is obvious that the processes are amenable to the usual variations employed in the Grignard synthesis. The selection of a solvent for the Grignard reagent is also subject to considerable latitude and any of the usual ethers may be employed. Ethyl ether boils at around 35° C., and while useable in the process, the higher boiling ethers are to be preferred due to the increased rate of reaction which accompanies the ambient temperatures at the higher boiling points. Accordingly, ethers which boil above 100° C. are preferred and of these normal butyl ether is a preferred solvent. Other ethers, boiling above 100° C., include secondary butyl ether, amyl ether, anisol, and benzyl ether. It is also permissible to use an excess of the organic halide, e.g., ethyl chloride, phenyl chloride, benzyl chloride, propyl chloride or corresponding bromides, etc. in place of the solvent or as a substitute therefor, and one may also substitute at least in part another anhydrous solvent such as xylene, toluene, cyclohexane or tertiary amines. Reaction temperatures range from room temperature to just below the decomposition temperature of the Grignard reagent. Preferred reaction temperatures range from 100° to 250° C. It is feasible to use autoclaves, etc. to run reactions above the normal boiling point of the solvent used. Other variations in the course of the Grignard practice may be employed. The silicon-oxygen materials employed in this process for ultimate conversion to organo-silicon products may vary considerably. They are broadly described as the silicon oxides and hydrous oxides. These categories include the various forms of silicon dioxides. For example, quartz, preferably in the finely ground state, silica gel, ground silica sand, diatomaceous earth, and silicon dioxide resulting from the oxidation or hydrolysis of silicon compounds such as the silicon hydrides, silicon oxyhydrides, and silicon tetrachloride may be used. Further examples of useful silicon compounds include $SiO_2$ and silicic acid from natural silicates by chemical degradation. These silicon dioxides may be used in the anhydrous condition or they may contain some water of hydration. This contained water may be present, and preferably so, in chemical combination with the silicon as for example in silicic acid and the various polysilicic acids. Other silicon-oxygen preparations in which the silicon appears to have a valence of less than 4 may also be used. For example, the sublimed material known as silicon monoxide obtained by heating silica and carbon at high temperatures may be used. While this is often called silicon monoxide it is also claimed to be a mixture of elemental silicon and silicon dioxide. In either case it is applicable to process of this invention.

Since the silicon oxides and related materials used in this process are all essentially solids, under the conditions used, one is concerned with a surface reaction. Consequently, any improvement in the surface reactivity is to be desired. Such reactivity may be obtained by various means of grinding which increase total surface. Grinding during the reaction may be particularly advantageous. Pretreatments of the solid materials to activate the surface may be used. Such pretreatment may include etching of the surface by chemical means in acid or basic environment, for example, aqueous solution of caustic or hydrofluoric acid. While the hydrous oxides of silicon may be used in this reaction, it is of course preferable to avoid the presence of free water since this merely destroys corresponding portions of the Grignard reagent.

Most of the siliceous starting materials used in this invention contain silicon in the tetravalent state, the atom being surrounded by 4 combined oxygen atoms. It is rather surprising to find that the Grignard reagent under the mild temperature conditions prevailing will attack this stable material. A reaction does not occur presumably taking place at the Si—O—Si linkage or in the case of the hydrated silicas also at the Si—O—H linkage. In the known reaction between Grignard reagents and silicon tetrahalides the attack of the Grignard upon the silicon compound appears to be of a random nature and consequently results in a normal distribution of the various chloro silane intermediate products. By this method then it appears to be impossible to get more than about a 50% yield of the difunctional silicone units upon hydrolysis of the product. One might also expect a similar random attack upon the tetravalent silicon oxide of this invention. However, it is surprising to find that the products from this method are unusually high in the difunctional silicone units which is indicated by the relatively large proportion of cyclopolysiloxanes shown to be recovered in the following examples. It is further interesting to note that one may apparently vary the structural nature of the polysiloxanes obtained by proper selection of the siliceous material used.

In practicing this invention one may isolate the initial products of the Grignard reaction which may include the mono-, di- and tri-organo-silicon Grignard complex materials. These may then be hydrolyzed by water or by dilute acid or base to give the corresponding organo silanols which in turn may be condensed, by the application of heat or dehydrating agents to the usual polysiloxanes. The hydrolysis of the Grignard intermediates may be carried out either before or after separation from the reaction medium. Usually, however, it is desirable to filter the reaction solution to remove traces of unreacted material before the hydrolysis and condensation steps are carried out. Mixtures of various Grignard intermediates prepared under varying conditions or from different starting materials may be blended together and co-hydrolyzed to form especially desired products. The usual known techniques of processing and handling the silanols and polysiloxanes are of course applicable to the products of this Grignard process. For example, the products of this invention are frequently unusually high in the cyclopolysiloxanes. These cyclic polymers may be converted by opening, and then recondensing to long chain polymers by means such as, for example, the method employing sulfuric acid described by Patnode and Wilcock in the Journal of the Amer. Chem. Soc., vol. 68, page 361.

The following examples are given to further disclose my improved method of producing siloxane compounds and are to be considered as revealing the simplicity of the process, but are not to be considered as in limitation of the invention.

Example I

In a 500 ml. round-bottomed three-necked flask fitted with efficient reflux-condenser, mechanical stirrer and dropping funnel were placed 12 g. of warm magnesium-turnings which before use had been washed with dry n-dibutyl ether and then dried for 15 minutes at 120° C. A small quantity of iodine (0.5 gram) was added to the flask and, shortly thereafter 100 ml. of n-dibutyl ether which had been distilled over sodium, and about 1 gram of pure ethyl bromide to start the reaction were added. The mixture was then heated to 70–80° C. and kept during the whole reaction at this temperature. A solution of 55 g. of pure ethyl bromide in 150 ml. of absolute n-dibutyl ether was run in slowly during 90 minutes. The same temperature as above was then maintained for another hour under stirring to complete the reaction.

After this, 5 grams of ground silica which had been dried before use for one hour at 120° C. were added and the mixture refluxed for 24 hours on an electric plate. The reaction mixture was allowed to cool and the liquid was decanted from the settled solids. A fresh 100 ml. portion of absolute normal dibutyl ether was added to the residue containing the solids and the mixture again refluxed for 30 minutes. The liquid was again removed by decantation method after cooling and this procedure was repeated three times. The ether extracts were united and the ether removed by distillation under reduced pressure (50–100 mm.). The flask was then allowed to cool to room temperature, placed in an iced water mixture and the yellowish-white contents were decomposed by the gradual addition of 150 ml. of a hydrochloric acid solution prepared by diluting the concentrated reagent with an equal volume of water. The oily layer was removed by means of a separatory funnel, dried over $Na_2SO_4$ and distilled under reduced pressure. The portion of the product boiling at 130–240° C. at 15 mm. pressure was separated and characterized by physical testing methods. The molecular weight was determined by the method of Beckmann (lowering of the freezing point) in cyclohexane and in addition the refractive index was determined. The fraction was found to be a mixture of ethylcyclosiloxanes which was suitable for use as a dielectric fluid.

Example II

Five grams of finely divided $SiO_2$ which had been prepared by evaporation and calcination of a silica sol were added to 200 ml. of a 2.5 molar solution of ethyl magnesium bromide in n-dibutyl ether. The resulting suspension was simultaneously stirred and boiled (ca. 140° C.) under reflux conditions in glass laboratory equipment for 32 hours. The insoluble residue was separated from the liquid portion of the reaction mass by decantation with the assistance of three 100 ml. portions of n-dibutyl ether after cooling to room temperature. The liquid fractions were combined and the solvent separated by distillation. The liquid silicon containing product was hydrolyzed by the addition of 150 ml. of concentrated HCl and 300 gms. of ice. After 24 hours the hydrolyzed product was extracted by shaking with 8 separate portions of ethyl ether of 100 ml. each. The 8 extraction solutions were combined, dried by sodium sulfate and the ether removed by evaporation. The recovered product (2.1 grams) was then vacuum distilled with the following results:

Fraction 1: 1.7 gms. ethyl siloxanes boiling at 170-250° C. at 18 mm. Hg.

Fraction 2: 0.4 gm. heavy silicon oil boiling above 300° C. at 18 mm. Hg.

Example III

Five grams of $SiO_2$ resulting from evaporation and calcination of a silicic acid sol were added to a solution of 25 grams of ethyl magnesium bromide in 250 ml. of n-dibutyl ether. The suspension while being stirred was boiled under reflux conditions for 48 hours. A silicon containing reaction product was extracted and recovered as in Example I and this was separated into two fractions as above. The more volatile fraction was found to be 3.0 grams of a mixture of ethyl siloxanes. The heavier fraction comprising 1.9 grams was Vaseline-like in character and was a silicone product of high molecular weight. A 55% yield on the Grignard reagent was obtained.

Example IV

Five grams of ground quartz were added to a solution of 15 grams of ethyl magnesium bromide in 250 ml. of n-dibutyl ether. This suspension was also boiled under reflux conditions and the silicon containing product was recovered as in the preceding examples. A lighter fraction of 2.8 grams boiled at 135-180° C. at 15 mm. Hg and was found to be made up of organo-siloxanes. The heavier fraction of 1.2 grams was yellowish-white and can be described as a highly viscous silicone product. A yield of 78% was obtained for the ethyl magnesium bromide employed.

Example V

Five grams of finely-divided $SiO_2$ prepared by complete oxidation of siloxene were added to 200 ml. of a 2.5 molar solution of ethyl magnesium bromide in n-dibutyl ether contained in a flask assembly as revealed in Example I. The mixture was heated under reflux conditions for a period of 48 hours and after cooling the liquid was decanted from the solid residue. This residue was washed several times with n-dibutyl ether and the washings combined with the liquid reaction product. The dibutyl ether solvent was removed by distillation with the assistance of vacuum and the residue containing the magnesium silanolates was hydrolyzed by the addition of dilute hydrochloric acid to which ice was added. The resulting oil was taken up in ether and the etheral layer removed by assistance of a separatory funnel. The organic material was then refractionated under vacuum and two fractions of organo-silicon compounds were recovered, having a total weight of 2.1 grams. The molecular weight of the fraction boiling at 170-250° C. at 18 mm. pressure was determined to be 347. The complete data for the 2 fractions is as follows:

| Fraction | Boiling Point, °C. | Pressure, mm. | Material | Yield, g. |
|---|---|---|---|---|
| 1 | 170-250 | 18 | cyclosiloxanes | 1.7 |
| 2 | above 300 | 18 | highly viscous silicones | 0.4 |

Example VI

Following the procedure of the preceding example, 11 grams of oxidized siloxene (capable of evolving 0.2 mol hydrogen per atom of silicon when acted upon by a dilute solution of alkali) were added to 250 ml. of solution of 67 grams ethyl magnesium bromide in n-dibutyl ether and then heated 32 hours under refluxing conditions. The reaction product was given the same treatment as in the preceding example and the organo-silicon compounds fractionally distilled under vacuum to yield 4 fractions having a total weight of 13.2 grams, which is equivalent to 51% of theoretical. Pertinent data for the 4 fractions are given below.

| Sample No. | Weight, g. | Boiling Point | Material |
|---|---|---|---|
| 1 | 1.5 | 134-140° at 16 mm. Hg | Hexaethylcyclotrisiloxane. |
| 2 | 2.7 | 170-180° at 16 mm. Hg | Octaethylcyclotetrasiloxane. |
| 3 | 0.8 | 180-200° at 5 mm. Hg | Decaethylcyclopentasiloxane. |
| 4 | 8.2 | above 200° at 1 mm. Hg | Residue (Vaseline-like silicones). |

Molecular weight determinations:

| Sample No. | Sample Wt., g. | $\Delta t$, (degrees) | Mol. Wt. | Mol. Wt. (Theory) |
|---|---|---|---|---|
| 1 | 0.1848 | 0.772 | 308 | 306.0 |
| 2 | 0.1791 | 0.550 | 418 | 408.0 |
| 3 | 0.1726 | 0.441 | 504 | 511.0 |
| 4 | 0.3067 | 0.164 | 2,400 | |

Example VII

As in the preceding examples, 250 ml. of a 0.75 molar solution of ethyl magnesium bromide in n-dibutyl ether and 5 grams of silicic acid which was obtained from well washed silicic acid gel which was subsequently heated to dryness were added to a reaction flask equipped with a stirrer and a reflux condenser. The mixture was heated at the boiling point for 48 hours and the reaction produced treated as in Example V. The product was again separated by fractionation under vacuum into two fractions, the more volatile of which weighed 3.0 grams and was a mixture of lower molecular organo-siloxanes. The heavier fraction weighed 1.9 grams and was Vaseline-like in consistency and was apparently a high molecular weight silicone product. The yield calculated on ethyl magnesium bromide amounted to 52% of the theoretical.

Example VIII

Five grams of silicon dioxide in finely powdered form were added to 250 ml. of half molar solution of ethyl magnesium bromide in n-dibutyl ether with stirring and the suspension was then evaporated to dryness. The dry reactants were heated for 36 hours at 143° C. during which time magnesium silanolates were formed. The organo-silicon compounds were extracted with hot benzol, separated from the solid residue and 2.3 grams of polysiloxanes were recovered from the benzol solution following the procedure used in the preceding examples wherein the organic product was treated with aqueous acid to effect hydrolysis and conversion of the material to a siloxane material.

It is quite evident from an examination of the various examples that the reaction may be carried out under varying conditions of temperature, concentration and time. The organic solvent used for the preparation and solution of the Grignard reagent may be any one of a number as explained heretofore, it being understood that the solvent should be anhydrous and preferably capable of dissolving substantial amounts of the Grignard reagent as well as the magnesium silanolate product. When the reaction is carried out in the absence of a solvent as in Example VIII, a solvent is to be used in separating the reaction product from any residual silica residue. The magnesium silanolate product is readily hydrolyzed by treatment with a water soluble acid such as HCl, $H_2SO_4$ as well as organic acids such as acetic acid. During this hydrolysis the magnesium is converted to the water soluble salt and removed with the aqueous layer.

The reaction is usually carried out at the boiling temperature of the solvent present and this is usually within the 100-250° C. range. N-dibutyl ether has a boiling point of 142° C. and has been found to be an excellent solvent. However, the process is not limited to such a solvent and one may even use solvents which do not boil within the preferred and stated temperature range, but the reaction may be carried out with the assistance of pressure to avoid evaporation of the solvent. The reaction proportions are not critical. From a practical point of view the silicon dioxide should be in excess. A digestion or reaction time of 24–72 hours is usually resorted to, but shorter or longer time to improve yields or other factors may be resorted to at the option of the operator. The hydrolyzed products obtained by the process of this invention are well known. They are useful as dielectric fluids and as hydraulic fluids and they may be further polymerized into silicon resins and rubbers. It is obvious that the process is amenable to continuous as well as batch operating methods.

Advantages obtained by this invention are first the possibility of utilizing relatively cheap and abundant sources of raw siliceous material without recourse to the intermediate steps of chlorination to silicon halides. Secondly, it seems that the method results in unusually high proportions of the preferred difunctional diorgano siloxy units

which are essential in preparing silicone fluids, etc., containing long chain silicone molecules.

We claim:

1. A process for the preparation of organo-silicon compounds which comprises commingling an inorganic silicon compound selected from the group consisting of silicon dioxides and hydrous silicon oxides with a Grignard reagent selected from the group consisting of alkyl Grignards and aryl Grignards, heating the commingled reagents at below the decomposition temperature of said Grignard reagent to effect reaction and recovering organo-silicon compounds.

2. A process for the preparation of organo-silicon compounds which comprises commingling an inorganic silicon compound selected from the group consisting of silicon dioxides and hydrous silicon oxides with a Grignard reagent selected from the group consisting of alkyl Grignards and aryl Grignards in solution in an inert organic solvent, heating the commingled reagents at a temperature of from 100–250° C. to effect reaction and recovering organo-silicon compounds.

3. A process for the preparation of organo-silicon compounds which comprises commingling an inorganic silicon compound selected from the group consisting of silicon dioxides and hydrous silicon oxides with a Grignard reagent selected from the group consisting of alkyl Grignards and aryl Grignards in solution in an inert organic solvent, heating the commingled reagents with agitation at a temperature within the range of 100–250° C. to effect reaction and recovering organo-silicon compounds.

4. A process for the preparation of organo-silicon compounds which comprises commingling a silicon dioxide with a Grignard reagent selected from the group consisting of alkyl Grignards and aryl Grignards in solution in an inert organic solvent, heating the commingled reagents to a temperature within the range of 100–250° C. to effect reaction and recovering the organo-silicon compounds.

5. A process for the preparation of organo-silicon compounds which comprises commingling a hydrous silicon dioxide with a Grignard reagent selected from the group consisting of alkyl Grignards and aryl Grignards in solution in an inert organic solvent, heating the commingled reagents to a temperature within the range of 100–250° C. to effect reaction, hydrolyzing the resulting silanolates and recovering the organo-silicon compounds.

6. A process for the preparation of organo-silicon compounds which comprises commingling an inorganic silicon oxide compound selected from the group consisting of silicon dioxides and hydrous silicon oxides with ethyl magnesium bromide in solution in n-dibutyl ether, heating to reflux temperature to effect reaction and recovering organo-silicon compounds.

7. A process for the preparation of organo-silicon compounds which comprises commingling an inorganic silicon oxide compound selected from the group consisting of silicon dioxides and hydrous silicon oxides with a Grignard reagent selected from the group consisting of alkyl Grignards and aryl Grignards in solution in an inert organic solvent, heating the commingled reagents to temperatures within the range of 100° C.–250° C. to effect reaction, hydrolyzing the resulting silanolates and fractionating the hydrolyzed organo-silicon comounds by distillation under vacuum conditions to recover siloxane products.

8. The process of claim 5 in which the hydrous silicon dioxide is a polysilicic acid.

References Cited in the file of this patent

FOREIGN PATENTS

| | | |
|---|---|---|
| 622,463 | Great Britain | May 3, 1949 |
| 832,753 | Germany | Feb. 28, 1952 |
| 840,395 | Germany | June 3, 1952 |

OTHER REFERENCES

McGregor: "Silicones and Their Uses" (1954), McGraw-Hill Book Co., Inc., New York, publishers, p. 20.